United States Patent [19]

Cucchi et al.

[11] Patent Number: 5,684,840
[45] Date of Patent: Nov. 4, 1997

[54] SYSTEM FOR ELIMINATING THE AFFECTED BY TRANSMISSION ERRORS IN A DIGITAL STREAM

[75] Inventors: Silvio Cucchi, Gaggiano; Carlo Costantini, Borca di Cadore, both of Italy

[73] Assignee: Alcatel N.V., Amsterdam, Netherlands

[21] Appl. No.: 229,362

[22] Filed: Apr. 18, 1994

[30] Foreign Application Priority Data

Apr. 29, 1993 [IT] Italy ................. MI93A0845

[51] Int. Cl.⁶ ........................................ H04B 1/10
[52] U.S. Cl. .................. 375/351; 455/223; 371/402
[58] Field of Search .................... 375/285, 343, 375/229, 232, 340, 341, 346, 348, 350, 351; 371/43, 6, 11.1, 40.2, 30; 364/724.19; 395/2.28, 2.29; 367/135, 901; 381/103; 455/217, 218, 223, 222

[56] References Cited

U.S. PATENT DOCUMENTS

| | | | |
|---|---|---|---|
| 4,243,935 | 1/1981 | Mcool et al. | 324/77 R |
| 4,384,354 | 5/1983 | Crawford et al. | 375/227 |
| 4,458,362 | 7/1984 | Berkovitz et al. | 381/103 |
| 4,577,161 | 3/1986 | Hirohashi et al. | 330/149 |
| 4,647,972 | 3/1987 | Strehl | 348/646 |
| 4,704,736 | 11/1987 | Kasser | 455/213 |
| 4,907,248 | 3/1990 | Bretl | 375/244 |
| 4,969,192 | 11/1990 | Chen et al. | 381/31 |
| 5,161,185 | 11/1992 | Hochschild | 379/416 |
| 5,309,443 | 5/1994 | Schorman | 371/5.5 |
| 5,323,457 | 6/1994 | Ehara et al. | 375/346 |
| 5,325,402 | 6/1994 | Ushirokawa | 375/341 |
| 5,345,452 | 9/1994 | Matui | 371/43 |
| 5,369,791 | 11/1994 | Asghar et al. | 455/222 |
| 5,383,202 | 1/1995 | Edgar et al. | 375/346 |
| 5,465,404 | 11/1995 | Retzer et al. | 455/220 |

FOREIGN PATENT DOCUMENTS

| | | |
|---|---|---|
| 0030720 | 6/1981 | European Pat. Off. . |
| 0103385 | 4/1987 | European Pat. Off. . |
| 3311911 | 10/1984 | Germany . |

*Primary Examiner*—Wellington Chin
*Assistant Examiner*—William Luther
*Attorney, Agent, or Firm*—Ware, Fressola, Van Der Sluys & Adolphson LLP

[57] ABSTRACT

A system for eliminating the effects of transmission errors in a digital stream is characterized by the presence of a predictor. The output signal of this system is taken from a predicted signal during the presence of errors and from the received signal when the errors are not present.

14 Claims, 3 Drawing Sheets

SYSTEM FOR ELIMINATING THE AFFECTED BY TRANSMISSION ERRORS IN A DIGITAL STREAM

The present invention relates to a system for processing analog signals transmitted in a digital form, temporarily affected by transmission errors as described in the preamble of claim 1.

During transmission, it may easily happen that disturbances are induced on signals so that they cannot be used in reception, particularly when the disturbance is prolonged.

One of the simplest methods of eliminating transmission errors is to silence the channel as long as noise is present.

Another method used is to repeat the last received correct value.

Although these methods are effective, the output is either missing or not compensated, hence other types of disturbances are introduced into the channel and a rough reconstruction of the original signal is anyway carried out.

The European Patent Application No. 83304418.3 discloses a system in which the last valid value is stored, the first and second derivatives are computed and the estimated slope of the signal affected by error is reconstructed from these.

In so doing, it is necessary to delay the channel in order to be able to store information and carry out the operations. Moreover, these operations, which are carried out only on the basis of the values just preceding the disturbance and do not take into account the waveform of the received signal, could interpret uncorrectly the waveform of the signal itself.

A method more effective than the previous ones, uses a technique of interpolating between the valid samples respectively preceding and following the error-affected one, to obtain the interpolated value.

With this technique, it is necessary to introduce in the channel a considerable delay to be able to allow the storage of information relative to the signal that precedes and follows the error sequence, and to carry out the consequent calculations, which in this case would be no longer reliable enough.

Therefore, these last described methods are valid mainly for not prolonged errors where the introduced delay is minimum and results can be considered as valid.

The main object of the present invention is then to provide a system for making the effects of the transmission error sequences imperceptible.

Therefore the system in accordance with the invention is structured as set forth in claim 1.

Further characteristics of the invention are set forth in the subclaims.

By using a predictor that allows the forecast of the received signal evolution with good accuracy, it is not necessary to use information relative to valid samples subsequent to the error sequence and, moreover, it is not necessary to introduce delay in the channel to store information relative thereto or to carry out computations.

The invention will now be described in more detail by reference to the attached drawings in which.

Figure 1:
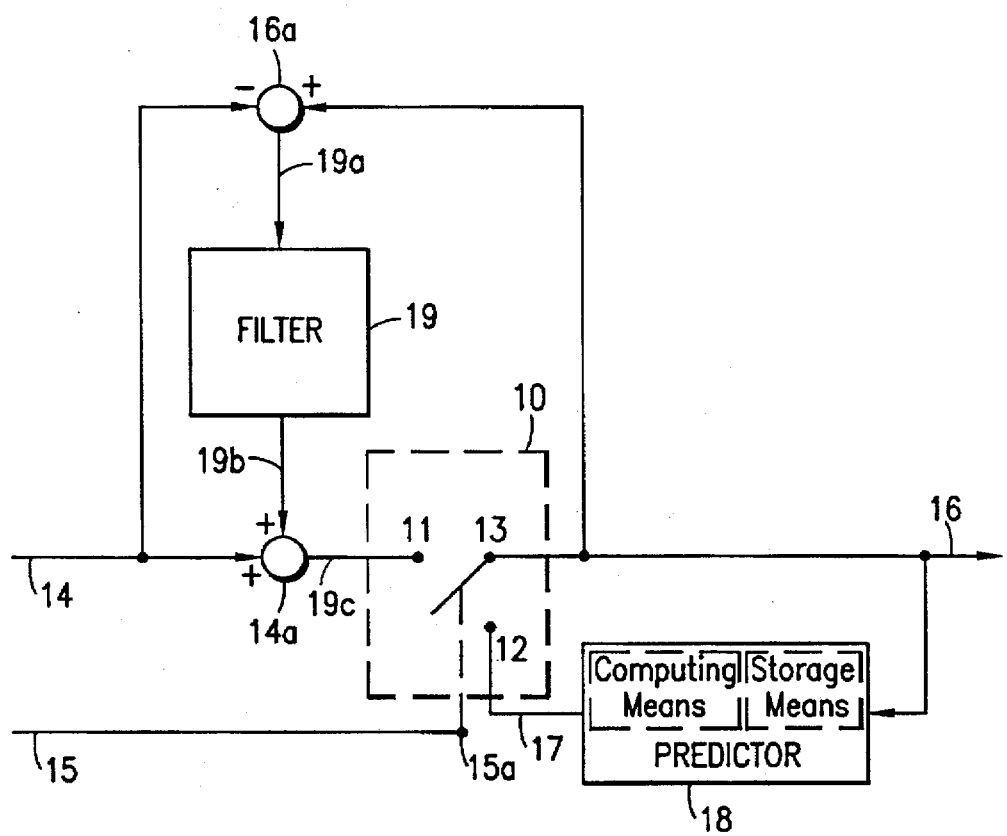
FIG. 1 is a block diagram of the subject system in a first embodiment of the invention.

According to a first embodiment of the subject system, FIG. 1 shows: a switch 10 with terminals 11, 12, 13; a terminal to which an input signal 14 is fed; a terminal to which a validity signal 15 of the input signal 14 is fed, that drives switch 10; a terminal to which an output signal 16 is fed and which is connected to terminal 13 of switch 10; a terminal to which a predicted signal 17 is fed; a predictor 18 having the output signal 16 as an input and the predicted signal 17 as an output, connected to terminal 12 of the switch 10; a filter 19 whose input is fed with the difference between the input signal 14 and the output signal 16 and whose output, summed to the input signal 14, is fed to terminal 11 of switch 10.

Assume that signal 14 is received in the form of numeric sample sequences and signal 15 is a signalling of the validity of the samples themselves, e.g., the output of a generic system detects temporary malfunctions on the channel; assume further that occasionally the samples of signal 14 can be affected by errors and, therefore, all useless. In order to replace these useless samples it is proposed here to use a predictor 18 well known from the literature and described later on.

Any type of predictor could be used, but during the realization it has been found that the adaptive linear predictor features very good performances.

If a sequence of useless samples starts, the switch 10 switches over the predicted signal 17. After a certain time interval the received samples will be valid again, hence switch 10 shall change over from predicted samples to valid samples. The use of the predictor, as herein described, solves the problem in question, but it may happen that the last change-over does not take place in the best possible way.

In order to see that this passage is as smooth as possible, i.e., without discontinuity, the filter 19 is used.

In the simplest case, this filter is composed of a delay cell followed by a multiplication by a positive constant less than one.

The more low-frequency components the signal has, the higher the smoothness, or better, the poor audibility of the change-over, is.

Figure 2:
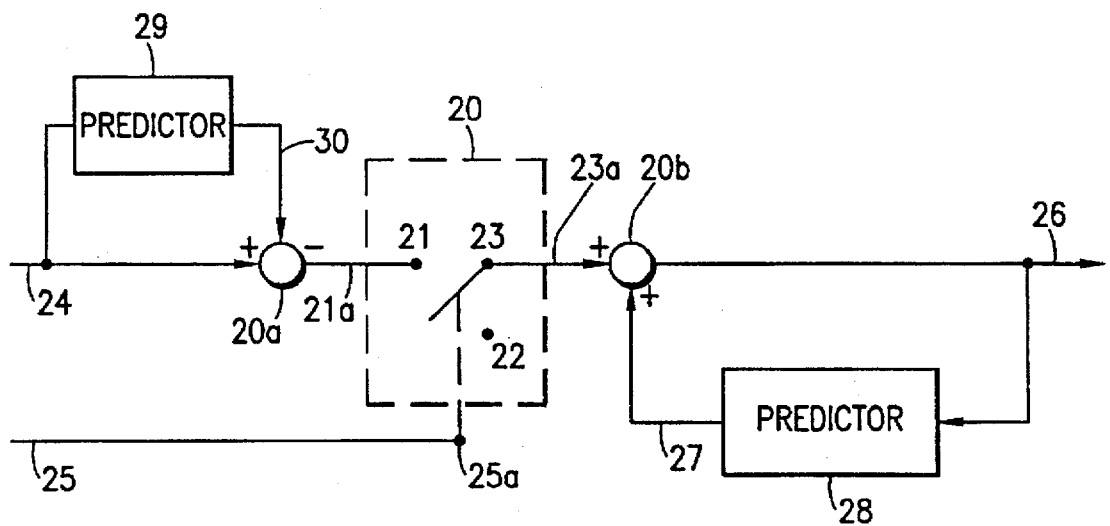
FIG. 2 is a block diagram of the subject system according to a second embodiment of the invention.

With reference to a second embodiment of the system as herein described and shown in FIG. 2, there is illustrated therein a switch 20 with terminals 21, 22 and 23, of which terminal 22 is disconnected; a terminal to which an input signal 24 is fed; a terminal to which a validity signal 25 of the input signal 24 is fed, that drives the switch 20; a terminal to which an output signal 26 is fed; a terminal to which a first predicted signal 27 is fed; a signal to which a second prediction signal 30 is fed; a first predictor 28 having the output signal 26 as an input and the first predicted signal 27 as an output which, summed to signal from terminal 23 of switch 20, is connected to the output signal 26; a second predictor 29 having signal 24 as an input and the second predicted signal 30 as an output which, subtracted from input signal 24, is connected to terminal 21 of the switch. The operation is similar to the one described previously.

In this case there is a slight increase in the circuit complexity, but the poor audibility of the change-over is assured apart from the spectral characteristics of the signal.

Predictors 28 and 29 are of the same type as predictor 18 of FIG. 1.

Figure 3:
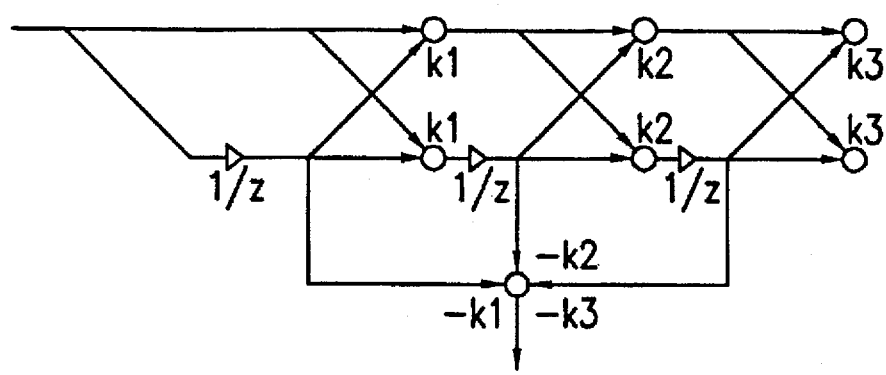
FIG. 3 is a schematic representation of a possible embodiment of the predictor.

In FIG. 3 there is shown the schematic representation of a possible realization of the above-mentioned predictors 18, 28, 29.

Having a stream of samples coming into the predictor, it generates the samples of the predicted signal.

This signal is obtained through the weighted average of the last input samples. Naturally the weights change slowly following the statistical characteristic of the signal.

Further details concerning theory and realization of the predictor can be found in the literature, e.g. in the book of Maurice Bellanger "DIGITAL PROCESSING OF SIGNALS", John Wiley & Sons.

Figure 4:
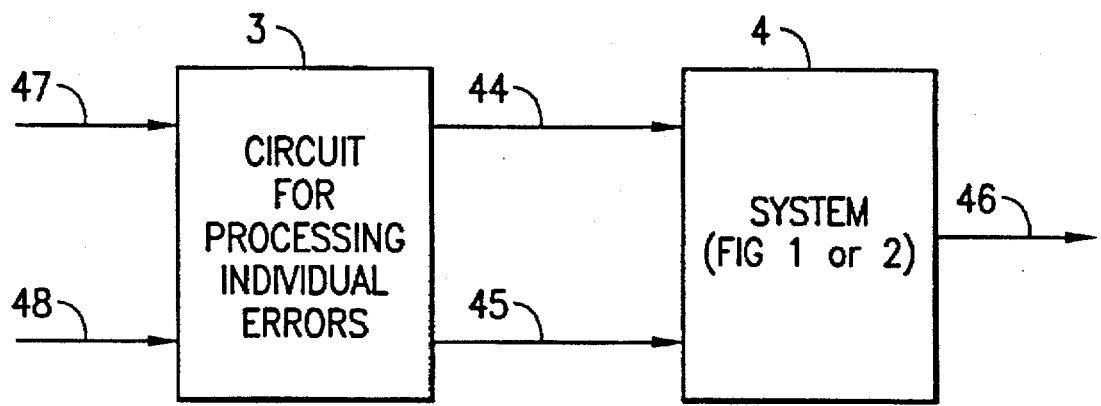
FIG. 4 is a block diagram of the subject system preceded by the circuit arrangement dedicated to the processing of single, not-valid samples.

In FIG. 4, block 4 represents the system as described above and may consist of either the system shown in FIG. 1 or the one shown in FIG. 2, and block 3 represents a circuit arrangement suitable for processing individual errors. This block is not indispensable, but the overall features are improved.

Figure 5:
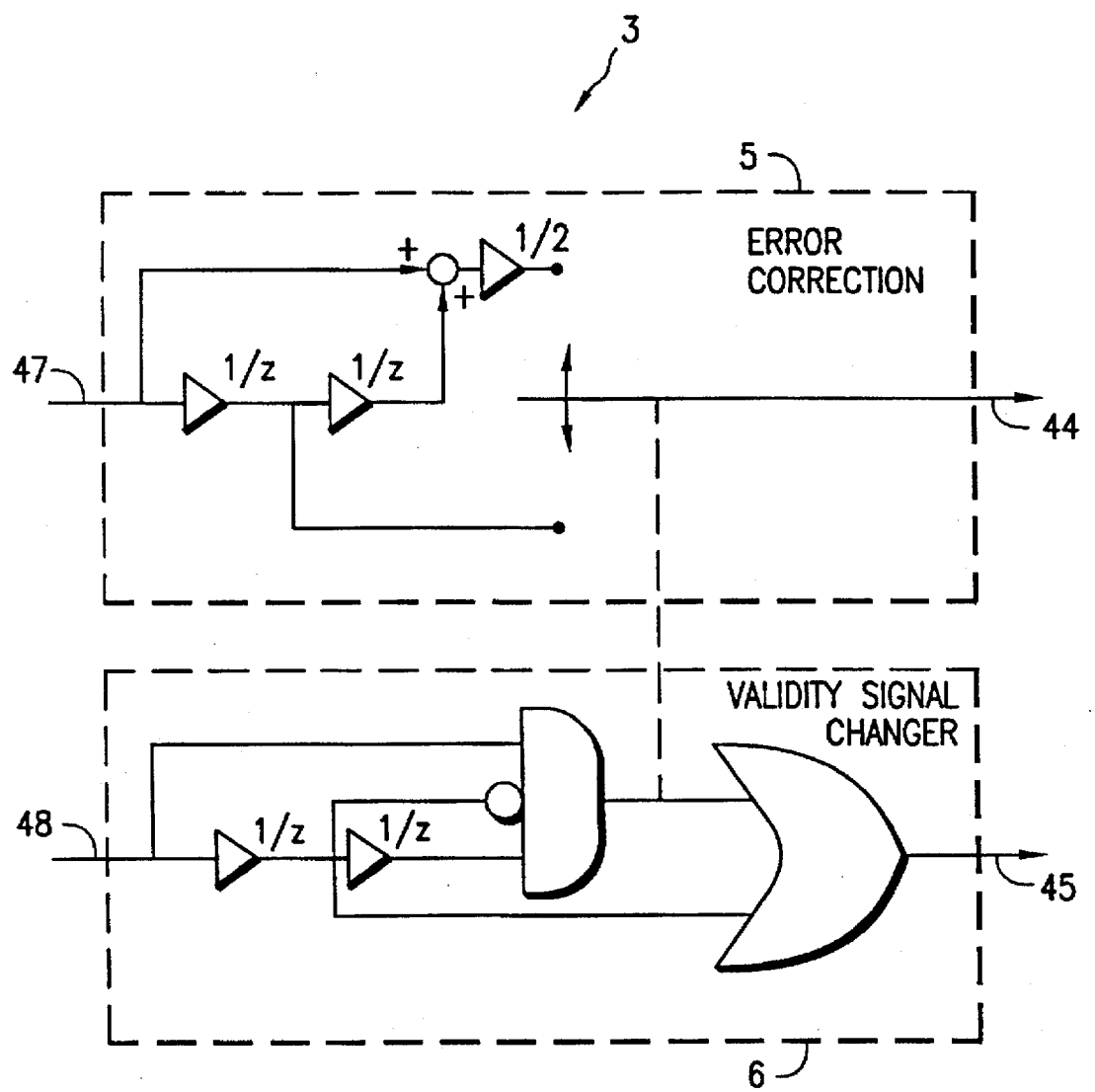
FIG. 5 shows a possible embodiment of the circuit dedicated to the processing of single, not-valid samples.

Block 3 could be constituted by any circuit arrangement known in the literature for processing individual errors, an example thereof being represented in FIG. 5 as used by the inventors in this circumstance. It consists mainly of two blocks:

An error correction block 5 that makes a linear interpolation, i.e. in presence of errors it replaces the error-affected sample with the average between the preceding sample and the successive one, while during normal operation, without the presence of errors, the signal is output passing through a delay cell.

A block 6 that changes the validity signal only in case of individual errors and leaves it unchanged in case of a sequence of errors.

It is obvious that these embodiments are susceptible of variations, replacements and modifications all falling within the scope and the spirit of the invention.

We claim:

1. A system for processing analog signals transmitted in the form of digital signals (14, 24), said digital signals being temporarily affected by transmission errors, said system comprising:

switching means (10, 20) for a first switch over from a situation of normal operation to a situation of operation in presence of errors and for a second switch over from the situation of operation in presence of errors to the situation of normal operation;

storage means for storing digital signal information indicative of the value of said digital signals (14, 24);

computing means for determining computed samples of said digital signals (14, 24) using said digital signal information stored in said storage means;

wherein said computing means determines the value of said computed samples by continually predicting expected values of said digital signals (14, 24);

wherein in response to said second switch over said computed samples are provided as an output signal; and circuit means, connected to said switching means, responsive to said digital signals and to said output signal, for eliminating a discontinuity in said output signal during said second switch over from the situation of operation in the presence of errors to the situation of normal operation.

2. A system according to claim 1, wherein the computing means is a predictor (18, 28).

3. A system according to claim 2, wherein the predictor (18, 28) is an adaptive linear predictor.

4. A system according to claim 1, wherein said switching means (10, 20) is driven by a validity signal (15, 25) which is indicative of a validity of said digital signals (14, 24).

5. A system according to claim 1, wherein a discontinuity measuring signal (19a) is filtered (19) and summed with said digital signals, (14) for providing a summed signal to said switching means, wherein said switching means provides said output signal (16) without the discontinuity, and wherein said discontinuity measuring signal is a difference between said digital signals (14) and said output signal (16).

6. The system of claim 1 preceded by a circuit arrangement (3) for signal processing, wherein the circuit arrangement processes individual transmission errors.

7. The system of claim 6, wherein said circuit arrangement processes a respective one of said individual transmission errors by making a linear interpolation between a first sample preceding said respective one of said individual transmission errors and a second sample following said respective one of said individual transmission errors.

8. A system for processing analog signals transmitted in the form of digital signals (14, 24), said digital signals being temporarily affected by transmission errors, said system comprising:

switching means (10, 20) for a first switch over from a situation of normal operation to a situation of operation in presence of errors and for a second switch over from the situation of operation in presence of errors to the situation of normal operation;

storage means for storing digital signal information indicative of the value of said digital signals (14, 24);

computing means for determining computed samples of said digital signals (14, 24) using said digital signal information stored in said storage means;

wherein said computing means determines the value of said computed samples by continually predicting expected values of said digital signals (14, 24);

wherein in response to said second switch over said computed samples are provided as an output signal; and circuit means, connected to said switching means, responsive to said digital signals and to a predicted signal, for eliminating a discontinuity in said output signal during said second switch over from the situation of operation in the presence of errors to the situation of normal operation.

9. A system according to claim 8, wherein, in order to eliminate the discontinuity, a predictor (29), for providing said predicted signal, is connected to said digital signals, (24) and a difference signal indicative of the difference between said predicted signal and said digital signals is provided to the switching means (20), and wherein said switching means provides said difference signal as said output signal for eliminating said discontinuity in said second switch over from the situation of operation in presence of errors to the situation of normal operation.

10. A system according to claim 8, wherein the computing means is a predictor (18, 28).

11. A system according to claim 10, wherein the predictor (18, 28) is an adaptive linear predictor.

12. A system according to claim 8, wherein said switching means (10, 20) is driven by a validity signal (15, 25) which is indicative of a validity of said digital signals (14, 24).

13. The system of claim 8 preceded by a circuit arrangement (3) for signal processing, wherein the circuit arrangement processes individual transmission errors.

14. The system of claim 13, wherein said circuit arrangement processes a respective one of said individual transmission errors by making a linear interpolation between a first sample preceding said respective one of said individual transmission errors and a second sample following said respective one of said individual transmission errors.

* * * * *

UNITED STATES PATENT AND TRADEMARK OFFICE
CERTIFICATE OF CORRECTION

PATENT NO. : 5,684,840
DATED : November 4, 1997
INVENTOR(S) : Cucchi et al.

It is certified that error appears in the above-identified patent and that said Letters Patent is hereby corrected as shown below:

On the title page:

Item: [54], In the title, replace "AFFECTED BY" with --AFFECTS OF--

Signed and Sealed this

Eleventh Day of August 1998

Attest:

Attesting Officer

BRUCE LEHMAN

Commissioner of Patents and Trademarks